United States Patent Office 3,559,259
Patented Feb. 2, 1971

3,559,259
METHOD FOR CONNECTING A LONGITUDINAL VIBRATOR WITH A BENDING VIBRATOR IN AN ULTRASONIC VIBRATING CUTTING SYSTEM, A TOOL AND A TOOL HOLDER THEREOF
Junichiro Kumabe and Osamu Taniguchi, Tokyo, Japan, assignors to Rikagaku Kenkyusho, Kitaadachi-gun, Saitama-ken, Japan
Filed Dec. 26, 1968, Ser. No. 787,060
Claims priority, application Japan, Dec. 30, 1967, 43/85,205, 43/85,206, 43/85,211
Int. Cl. B26d 1/00; B23b 3/00
U.S. Cl. 29—96          6 Claims

ABSTRACT OF THE DISCLOSURE

A tapered hole in the thickwise direction of a bending vibrator being adapted to fit with a mating tapered shape of a longitudinal vibrator and said tapered hole being provided with reliefs toward the upper and under sides of bending vibrator thereby avoiding heat development from the connection, eliminating the adverse effect of thermal expansion of the cutting edge and reducing the cutting cost accordingly.

---

In the art of ultrasonic vibrating cutting whereby a work is machined by a cutting tool vibrated with an ultrasonic frequency $f$ and amplitude $a$ in the cutting direction thus establishing a relation of $v < 2\pi a f$ where $v$ is the cutting velocity, it is commonly in practice to magnify the amplitude of a magneto- or electro-strictive vibrator to some extent with the aid of a magnifying horn and connect the free end of the horn to a cutting tool in order that the magnified amplitude be made available as an effective amplitude for the cutting edge. The tool and horn are usually connected in either of two ways, i.e., screw connection and taper connection.

This invention relates to a new method for connecting in an ultrasonic vibrating cutting system, a taper connection type cutting tool and a cutting tool holder thereof.

According to the present invention, there is characterized in that it avoids heat development from the connection which is often the case with conventional tools of the type, thereby eliminating the adverse effect of the thermal expansion of the cutting edge upon the accuracy of finishing and thus reducing the machining cost accordingly.

The present invention will be more fully described hereunder in conjunction with the accompanying drawings.

Figure 3:
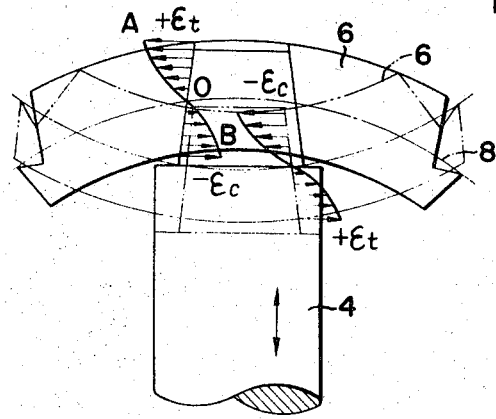
Figure 4:
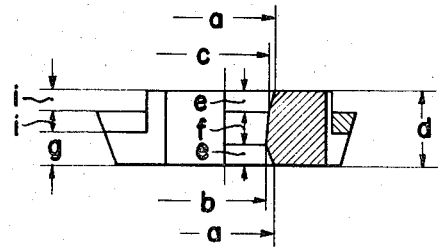

FIG. 3 is a diagrammatic view showing the mode of vibration of a conventional cutting tool for vibrating cutting; and FIGS. 4 to 7 are views explanatory of an embodiment of the invention; FIG. 4 being a sectional view showing the contour and dimensions of a cutting tool, FIG. 5 being a graph indicating the continuous finishing accuracy in terms of cutting time and dispersion of finishes, FIG. 6 being a plan view of tool holder provided with a tool according to the present invention and FIG. 7 being a side view of the above holder.

Figure 1:
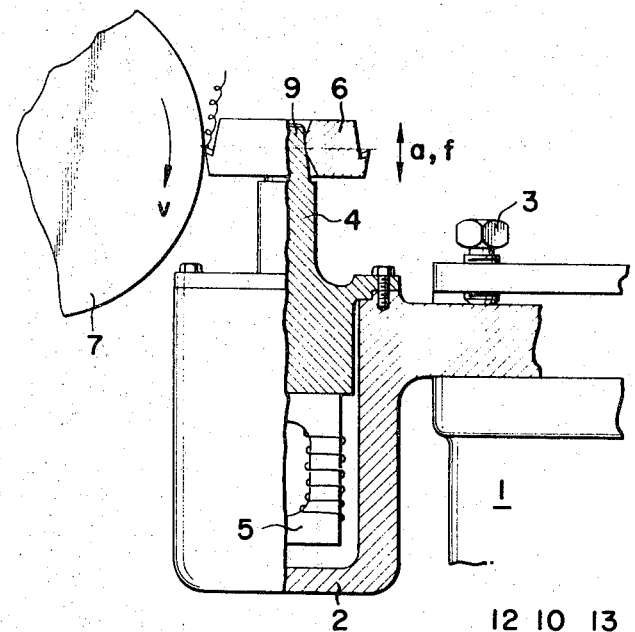
FIG. 1 is a diagrammatic side view of the cutting tool arrangement for turning operation that embodies the present invention.
Figure 2:
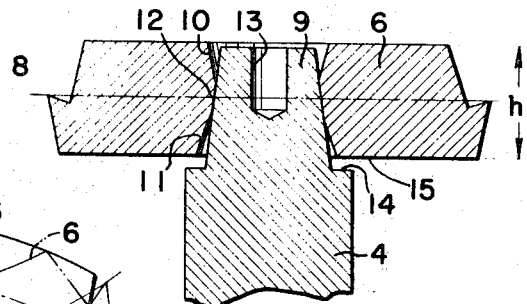
FIG. 2 is a diagrammatic sectional view along the axial center of a cutting tool embodying the invention, illustrating how it is connected with a horn for driving the same with longitudinal vibration.

Referring specifically to FIG. 1, a cooling tank 2 being filled with an appropriate amount of a water therein and being equivalent to the shank of a cutting tool for ordinary machining use is fixedly secured to a tool post 1 of a lathe with a clamping bolt 3 as shown. Inside the cooling tank 2, a step horn 4 is jointed at its lower end with a longitudinally vibrating, magneto-strictive vibrator 5, which is a longitudinal vibrator of the present invention, and the step horn 4 is flanged so that it can be fixed at its vibratory section to the cooling tank 2. In this way is constructed a tool holder for driving and vibrating the tool up and down. The top end of this tool holder and hence of the step horn 4 is gently tapered as shown in the reference numeral 9. A cutting tool of a bending vibrator of the present invention provided with a correspondingly tapered hole is connected to the tapered end 9 of the holder. It is fastened and secured by a means of a clamp screw (shown in FIG. 2) in place lest the connection should be loosened by vibrations. The hole of the tool is not tapered across the total thickness of the tool. As shown in FIG. 2, the tool is engaged with the step horn 4 in such a manner that only a limited area of the surrounding wall of the hole that is equivalent to approximately one-third the tool thickness $h$ about the center 8 of the thickness is in contact with the tapered part 9 of the front end of the step horn, and the tool is fastened in position with a clamp screw 13. With the arrangement described, the cutting edge can be vibrated as shown in FIG. 1 with a frequency $f$ and amplitude $a$ in the directions indicated by arrows to accomplish ultrasonic vibrating cutting of the work 7 in an ideal manner.

Thus, the present invention is featured by the fact that, instead of the conventional taper connection whereby the tapered part 9 of the horn 4 is in contact with the entire surrounding wall surface of a hole in a tool 6, the hole in the tool according to the invention as shown in FIG. 2 is additionally provided with a relief taper 10 from the upper side and another relief taper 11 from the under side so that the tapered part 9 of the horn is in contact with the surrounding wall of the hole only at the middle tapered part 12. Of course, the under side 15 of the tool 16 is kept away from the shoulder 14 of the horn 4. The advantage derivable from this arrangement will be explained by reference to FIG. 3. The tool shown is so shaped as to assume a mode of primary bending vibration, and is of a contour adapted to be driven vibratingly by a tool holder which drives and vibrates the tool in the longitudinal center point with a single amplitude $a$. Assuming now that the tapered part 9 of the horn 4 is in contact with the surrounding wall of the hole of the tool 6 across the entire thickness thereof, a tensile strain $+\epsilon_t$ and a compressive strain $-\epsilon_c$ will then be produced per cycle, repeatedly in the longitudinal direction in the upper part of the tool and, at the same time, in the lower part of the tool there will be produced an opposite compressive strain $-\epsilon_c$ and an opposite tensile strain $+\epsilon_t$. As the result, expansion and contraction as represented by a curve AOB occur repeatedly therebetween. This means that the section of the hole which is statically round is somewhat elongated longitudinally to a slightly elliptical shape at a dynamic moment in vibration. It is only around the center axis 8 where substantially perfect roundness is maintained.

The strains that develop in the dynamic state during the course of actual operation make it meaningless to strive for a highest degree of finishing accuracy in the static sense. If the condition above described is left as it is, the repeated occurrence of the strains will give repeated impacts to the front end 9 of the horn with a sharp temperature rise due to the heat of friction which may eventually invite breakage with fatigue and many other troubles, thus rendering it impossible to continue the ultrasonic vibrating cutting. The unfavorable strain characteristics as represented by the curve AOB cannot be eliminated because they are inherent to a cutting tool designed to vibrate in the manner above described. According to the present invention, therefore, the cutting tool is fitted to the holder in such a manner that the tapered end portion of the horn contacts only with the tapered part about the center axis of the hole which is almost perfectly round, since the portions of the hole where repeated strains would otherwise develop are formed with two tapered parts for relief purpose to be out of contact with the horn and to avoid heat development.

EXAMPLE

Figure 6:
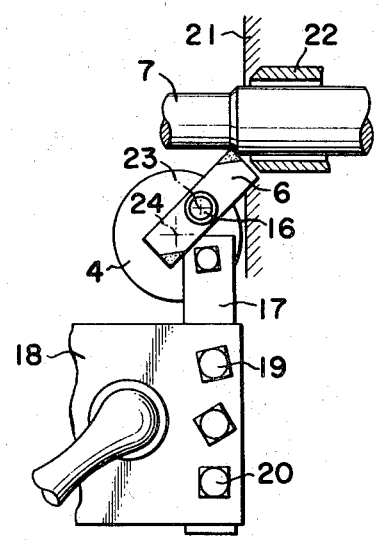
Figure 7:
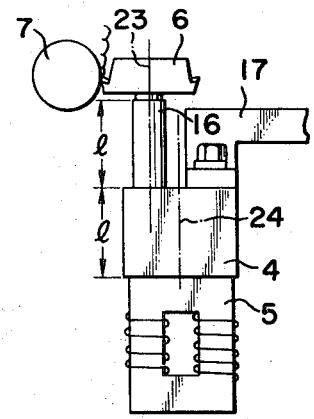

A cutting tool of cemented carbide (K10) according to the invention which had the contour and dimensions as shown in FIG. 4 was fitted to a tool holder of an automatic lathe, and said tool holder is shown in FIGS. 6 and 7, the reference numeral 16 designates a shaft; 17 designates a fitting jig; 18 designates a tool post of single spindle lathe with a plurality of blades; 19, 20 designate screw; 21 designates a rocking arm; 22 designates a guide bush; 23, 24 designate a central axis line of the tool 6 and the horn 4 respectively; 1 designates one-fourth of wave length.

Further, each size in FIG. 4 designates $a = 9\phi$ mm., $b = 7.48\phi \pm 0.01$ mm.,
$c = 7.96\phi \pm 0.001$ mm., $d = 7$ mm.,
$e = 2$ mm., $f = 3$ mm.,
$g = 3$ mm., $i = 2$ mm., and work pieces of 0.5 mm.-dia. stainless steel were continuously machined under predetermined cutting conditions, i.e., with a spindle speed of 4,650 r.p.m., depth of cut of 0.03–0.04 mm., feed of 3–5 $\mu$/rev., tool frequency of 40 kHz, and amplitude of 15$\mu$. Exceedingly fine accuracy of finishing was attained as graphically indicated in FIG. 5.

Figure 5:
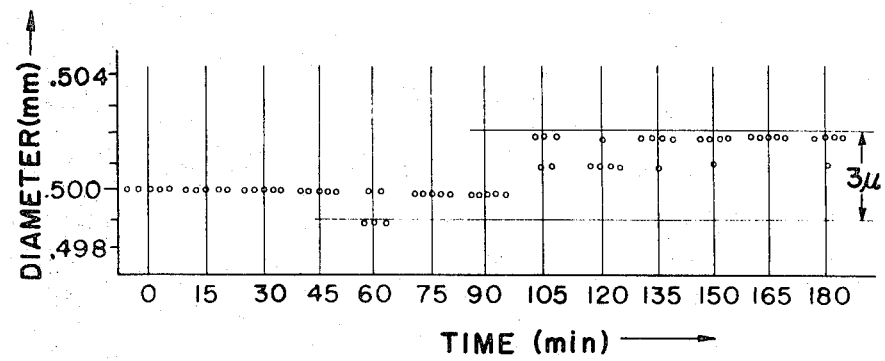

The graph in FIG. 5 was compiled by sampling five work pieces each at intervals of 15 minutes during the course of machining of about 500 pieces over a machining period of about 4 hours, measuring the diameters of the sampled pieces, one by one, and charting the measured values in terms of dots against the time elapsed.

As can be seen from the results of the example above described, the use of a cutting tool in accordance with the present invention caused no deviation from the specified value in one hour and resulted in a variation of thickness of only 3$\mu$ in three hours. Thus, extremely high accuracy is attained in continuous machining operation. This is made possible by the fact that the heat development from the connection of the tool with the holder is prevented and that the thermal expansion and wear of the cutting edge are therefore minimized. These facts demonstrate the excellent quality of the tool of the invention for use in ultrasonic vibrating cutting.

What we claim is:

1. Cutting apparatus for ultrasonic vibrating cutting comprising a cutting tool, said cutting tool having means defining an opening, said opening having a first portion at one longitudinal end, a second portion at the other longitudinal end and a third tapered portion intermediate said first and second portions, a cutting tool holder having a section received in said opening of said cutting tool, said cutting tool section having a tapered portion mating with said intermediate tapered portion of said cutting tool opening, said cutting tool holder section and said cutting tool opening being constructed and arranged such that said first and second portions of said cutting tool opening are spaced from said cutting tool holder section.

2. Cutting apparatus according to claim 1 wherein said first, second, and third portions of said cutting tool opening and said cutting tool holder section are frustoconical.

3. Cutting apparatus according to claim 2 wherein said cutting tool holder has a support base from which said cutting tool section extends, said second portion of said cutting tool opening being adjacent said support base, said second portion of said cutting tool opening having a cone angle different from the cone angle of said third portion of said cutting tool opening.

4. Cutting apparatus according to claim 3 wherein the cone angle of said second portion of said cutting tool opening is greater than the cone angle of said cutting tool holder section.

5. Cutting apparatus according to claim 2 wherein the smallest longitudinal ends of said first and second portions of said cutting tool opening are adjacent said third tapered portion of said cutting tool opening.

6. Cutting apparatus according to claim 3 wherein said support base has a shoulder from which said cutting holder section extends, said shoulder being spaced from said cutting tool.

References Cited

UNITED STATES PATENTS

| 1,292,494 | 1/1919 | Lorenz | 82—1 |
| 2,404,222 | 7/1946 | Doner | 29—96X |
| 2,452,211 | 10/1948 | Rosenthal | 29—96X |
| 2,498,881 | 2/1950 | Eldridge | 29—96X |

FOREIGN PATENTS

| 714,860 | 9/1954 | Great Britain | 82—916 |
| 925,205 | 3/1955 | Germany | 29—105 |

HARRISON L. HINSON, Primary Examiner

U.S. Cl. X.R.

82—1